United States Patent
Beser

(10) Patent No.: US 7,386,013 B1
(45) Date of Patent: Jun. 10, 2008

(54) SYSTEMS AND METHODS FOR COMPRESSING PACKET HEADERS

(75) Inventor: Nurettin Burcak Beser, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1122 days.

(21) Appl. No.: 10/378,868

(22) Filed: Mar. 5, 2003

Related U.S. Application Data

(60) Provisional application No. 60/437,731, filed on Jan. 3, 2003.

(51) Int. Cl.
*H04J 3/18* (2006.01)
(52) U.S. Cl. .................................................... 370/477
(58) Field of Classification Search ................... None
See application file for complete search history.

(56) References Cited

U.S. PATENT DOCUMENTS

| | | | | |
|---|---|---|---|---|
| 7,039,048 | B1* | 5/2006 | Monta et al. ............... | 370/389 |
| 2002/0044225 | A1* | 4/2002 | Rakib ......................... | 348/734 |
| 2002/0046406 | A1* | 4/2002 | Chelehmal et al. .... | 375/240.01 |
| 2002/0093955 | A1* | 7/2002 | Grand et al. ................ | 370/389 |
| 2002/0106029 | A1* | 8/2002 | Bunn et al. .................. | 375/257 |
| 2002/0191691 | A1* | 12/2002 | Holborow ................... | 375/240 |

OTHER PUBLICATIONS

Data-Over-Cable Service Interface Specifications; Radio Frequency Interface Specification; SP-RFIv1.1-I08-020301; Mar. 1, 2002; pp. 67-72; 313-318.
Data-Over-Cable Service Interface Specifications; Radio Frequency Interface Specifications; SP-RFIv1.1-I09-020830; Aug. 30, 2002; pp. 170-178.
Information Technology; Generic Coding of Moving Pictures and Associated Audio: Systems; ISO/IEC 13818-1; International Organisation for Standardisation Organisation Internationale De Normalisation; Nov. 13, 1994; pp. 1-136.

* cited by examiner

*Primary Examiner*—Huy D. Vu
*Assistant Examiner*—Phuongchau B Nguyen
(74) *Attorney, Agent, or Firm*—Harrity Snyder, LLP

(57) ABSTRACT

A system processes data units in a network. The system receives a data unit that includes a group of headers and suppresses one or more of the headers to form a reduced data unit. The system suppresses one or more other headers of the reduced data unit to form a further reduced data unit and transmits the further reduced data unit to one or more destination devices using the program identifier (PID) field in the MPEG header as an index to suppressed headers.

16 Claims, 7 Drawing Sheets

SYSTEMS AND METHODS FOR COMPRESSING PACKET HEADERS

This application claims priority under 35 U.S.C. §§ 119(e) to 60/437,731 filed on Jan. 3, 2003; the entire content of which is hereby incorporated by reference.

FIELD OF THE INVENTION

The present invention relates generally to communications systems and, more particularly, to systems and methods for compressing packet headers in a cable modem network.

BACKGROUND OF THE INVENTION

Cable modems (CMs) allow end-users to connect to networks, such as the Internet, through cable television lines. In a manner similar to traditional telephone modems, CMs modulate between digital signals from an attached computing device to analog signals that are transmitted over the cable lines. Unlike traditional telephone dial-up modems, however, CMs mat provide significantly greater throughput.

CMs are generally installed locally to the end-user, and communicate with a cable modem termination system (CMTS) at a local cable television company office. Multiple CMs may share a single physical communication channel with the CMTS. The CMs can receive signals from and send signals to the CMTS, but not directly to other CMs on the channel.

Over the past decade, the popularity of CM systems has risen dramatically. As the popularity of CM networks increases and, thus, the number of CMs in the network increases, system designers seek ways to reduce bandwidth in order to allow CMTSs to accommodate greater numbers of CMs.

Therefore, there exists a need for improved techniques for transmitting data in a cable modem network.

SUMMARY OF THE INVENTION

Systems and methods consistent with the present invention address this and other needs by providing a technique that reduces the bandwidth between a CMTS and a CM.

In accordance with the purpose of this invention as embodied and broadly described herein, a network device is provided that includes logic configured to receive a data unit that includes a group of headers; logic configured to suppress one or more headers of the data unit to form a reduced data unit; logic configured to suppress one or more other headers of the reduced data unit to form a further reduced data unit; and logic configured to transmit the further reduced data unit to one or more destination devices.

In another implementation consistent with the present invention, a network device is provided that includes logic configured to receive a data unit, where the data unit includes a moving picture experts group (MPEG) program identifier (PID; logic configured to determine whether one or more headers of the received data unit have been suppressed using the MPEG PID as an index; logic configured to add one or more headers to the received data unit when one or more headers have been suppressed to form a first data unit; logic configured to add one or more additional headers to the first data unit to form a second data unit; and logic configured to transmit the second data unit.

In yet another implementation consistent with the present invention, a method for transmitting packets in a cable modem network is provided. The method includes receiving a packet including a group of headers; removing one or more headers of the group of headers from the received packet to form a first packet; creating a first index based on the one or more headers; removing one or more other headers from the received packet to form a second packet; creating a second index based on the one or more other headers; and transmitting the second packet and the second index to a device.

In still another implementation consistent with the present invention, a method for processing a data unit is provided. The method includes receiving a data unit including an index; restoring one or more headers to the data unit based on the index to form a first data unit, where at least one of the one or more headers includes a second index; adding one or more other headers to the first data unit based on the second index to form a second data unit; and transmitting the second data unit.

In a further implementation consistent with the present invention, a method for transmitting packets in a network is provided. The method includes receiving an Internet Protocol (IP) packet at a first device, converting the received IP packet to a moving picture experts group (MPEG) transport stream (TS) packet, and transmitting the MPEG TS packet to a second device.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Systems and methods consistent with the present invention provide a dual IP/MPEG TS system in which IP packets can be converted into MPEG TS packets, and vice versa. In an exemplary implementation, a CMTS converts IP packets to smaller MPEG TS packets and transmits these packets to CMs and set top boxes, resulting in a significant savings in downstream bandwidth.

Exemplary Network

Figure 1:
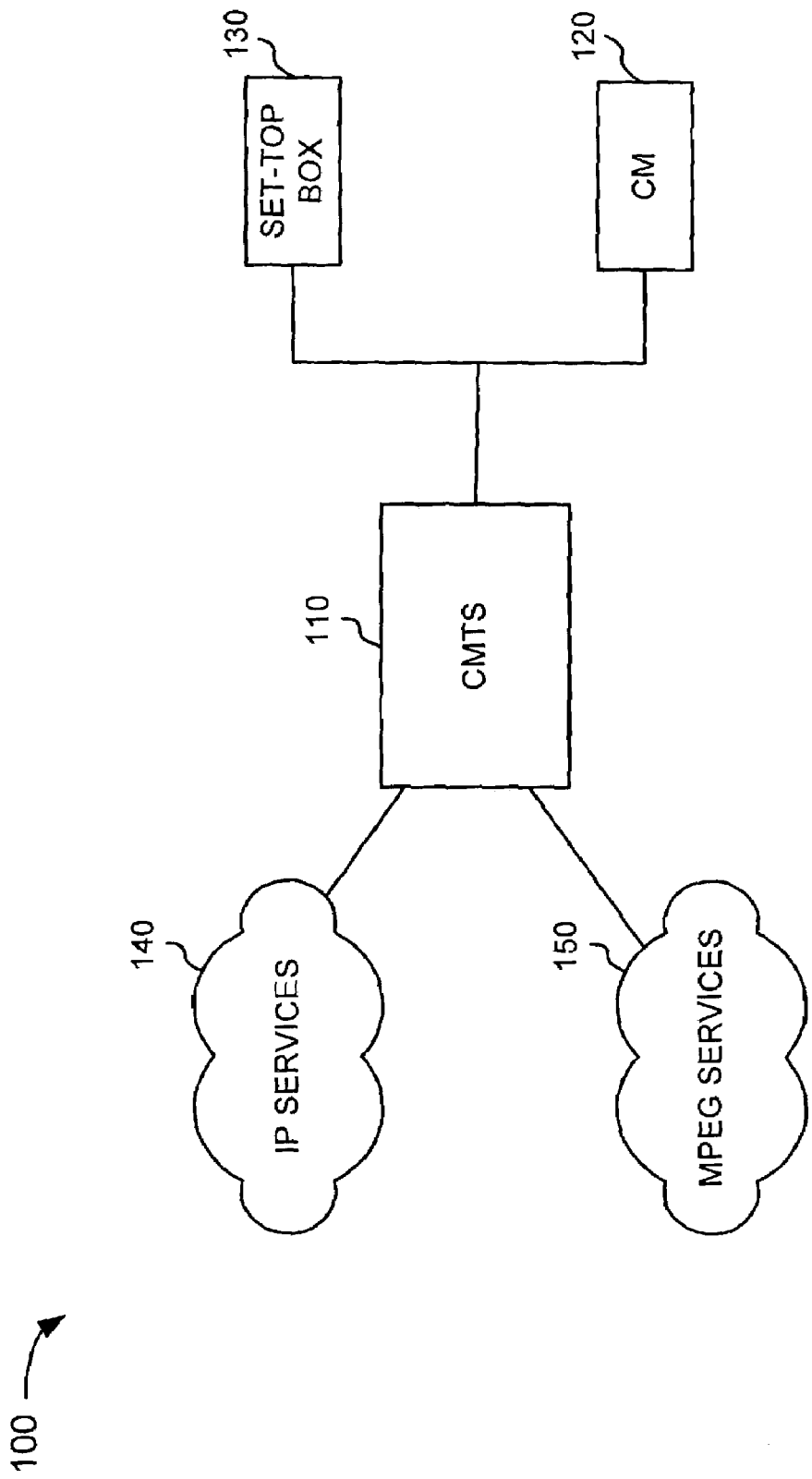
FIG. 1 illustrates an exemplary network in which systems and methods consistent with the principles of the present invention may be implemented.

FIG. 1 illustrates an exemplary network 100 in which systems and methods consistent with the principles of the present invention may be implemented. As illustrated, network 100 may include a CM 120 and a set top box 130 that connect to IP services 140 and MPEG services 150 via a CMTS 110. The number of devices illustrated in FIG. 1 is provided for simplicity. A typical network 100 may include more or different devices than illustrated in FIG. 1.

CMTS 110 provides an interface that allows CM 120 and set-top box 130 to receive data transmissions from IP services 140 and MPEG services 150. In one implementation consistent with the principles of the present invention, CMTS 110 may receive MPEG TS packets from MPEG services 150 and transmit these packets to CM 120 and set top box 130 for processing. CMTS 110 may also receive IP packets from IP services 140, convert these IP packets to MPEG TS packets by performing deep packet header suppression (dPHS) processing, and transmit these packets to CM 120 and set top box 130 for processing. Data may also flow from set top box 130 and CM 120 to IP services 140 and MPEG services 150.

CM 120 may include one or more CMs capable of receiving MPEG TS packets. In one implementation consistent with the principles of the present invention, CM 120 may convert received MPEG TS packets to IP packets for transmission to, for example, a customer's computer or other device (not shown). Set top box 130 may include one or more conventional set top boxes available from a number of manufacturers. Set top box 130 may receive MPEG TS packets from CMTS 110 and process the packets in a well-known manner to allow for the packet's content to be played on a television or other device (not shown).

IP services 140 may include any IP data source or sink, such as a movie database capable of providing or receiving streaming video and/or audio. MPEG services 150 may include MPEG video and/or audio data sources or sinks. As described above, CMTS 110 may communicate IP packets with IP services 140 and MPEG TS packets with MPEG services 150.

Figure 2:
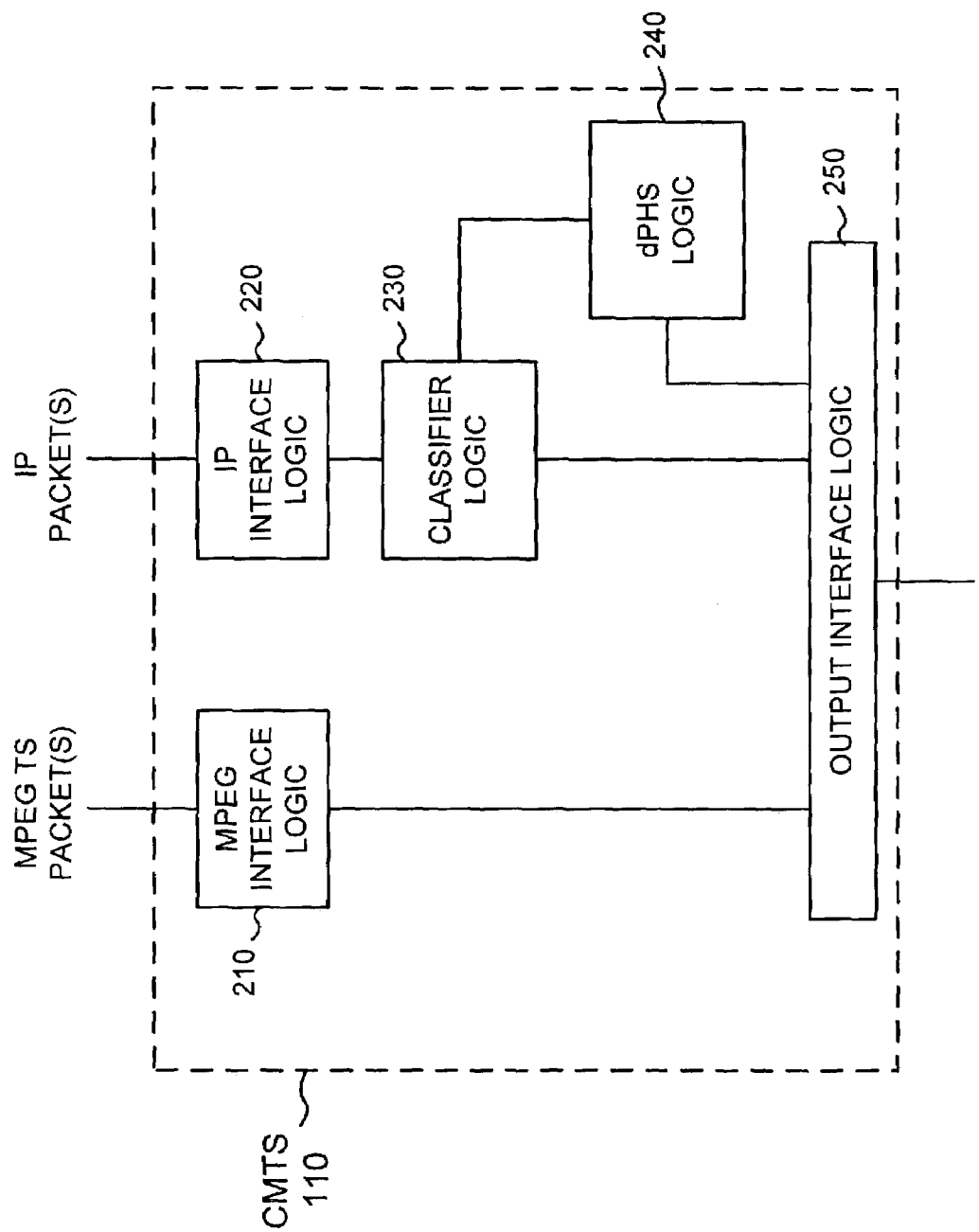
FIG. 2 illustrates an exemplary configuration of the CMTS of FIG. 1 in an implementation consistent with the principles of the present invention.

FIG. 2 illustrates an exemplary configuration of CMTS 110 of FIG. 1 in an implementation consistent with the principles of the present invention. As illustrated, CMTS 110 may include MPEG interface logic 210, IP interface logic 220, classifier logic 230, dPHS logic 240, and output interface logic 250. CMTS 110 may further include other components (not shown) that aid in the reception, transmission, and/or processing of data.

MPEG interface logic 210 may include one or more memory devices that temporarily store MPEG TS packets received from MPEG services 150. Similarly, IP interface logic 220 may include one or more memory devices that temporarily store IP packets received from IP services 140.

Classifier logic 230 may include logic that receives IP packets from IP interface logic 220 and decides, for each packet, whether dPHS processing should be applied to the packet. In one implementation consistent with the present invention, classifier logic 230 may determine that dPHS processing should be applied when an IP packet is associated with MPEG data. As will be described in detail below, dPHS logic 240 may include logic that converts an IP packet into an MPEG TS packet by compressing one or more fields in the IP packet when classifier logic 230 identifies the packet as being associated with MPEG data. Output interface logic 250 may include logic that transmits packets to the appropriate destination(s) in a well-known manner. Output interface logic 250 may transmit MPEG TS packets to CM 120 and/or set-top box 130.

Figure 3:
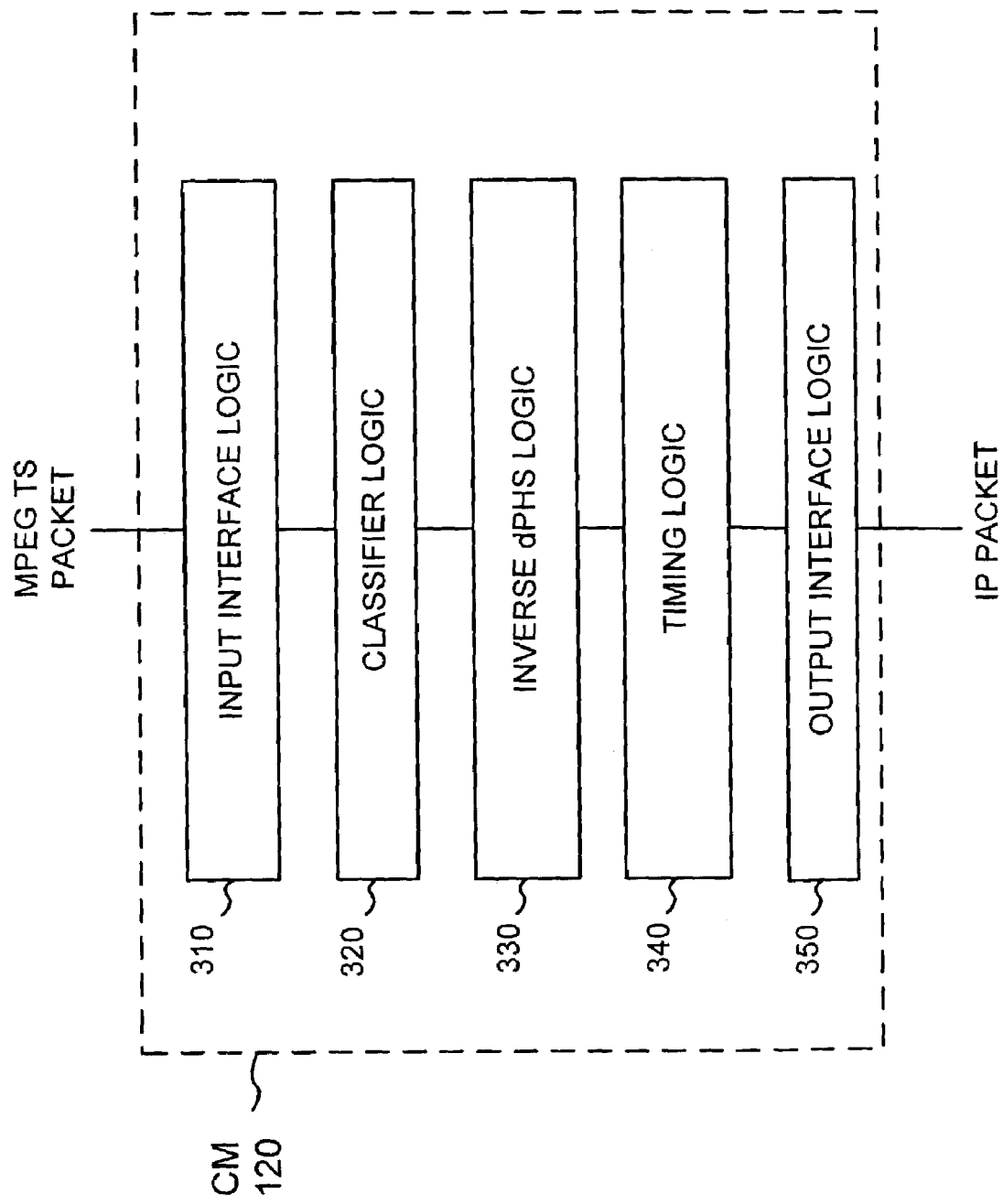
FIG. 3 illustrates an exemplary configuration of the CM of FIG. 1 in an implementation consistent with the principles of the invention.

FIG. 3 illustrates an exemplary configuration of CM 120 of FIG. 1 in an implementation consistent with the principles of the invention. As illustrated, CM 120 may include input interface logic 310, classifier logic 320, inverse dPHS logic 330, timing logic 340, and output interface logic 350. CM 120 may also include other components (not shown) that aid in the reception, transmission, and/or processing of data.

Input interface logic 310 may include one or more memory devices that temporarily store MPEG TS packets received from CMTS 110. Classifier logic 320 may include logic that receives MPEG TS packets from input interface logic 310 and decides, for each packet, whether inverse dPHS processing should be applied to the packet. In one implementation consistent with the present invention, classifier logic 320 may determine that inverse dPHS processing should be applied based on an MPEG value contained in the packet. As will be described in detail below, inverse dPHS logic 330 may include logic that converts an MPEG TS packet into an IP packet by adding those fields removed by dPHS logic 240 in CMTS 110. Timing logic 340 may include logic that adds a timing signal, such as a time stamp, to IP packets to ensure that the IP packets are processed in the correct order at a destination device. Output interface logic 350 may include logic that transmits IP packets to the appropriate destination(s) in a well-known manner. Output interface logic 350 may, for example, transmit IP packets to computer devices associated with one or more customers.

Exemplary Processing

Figure 4:
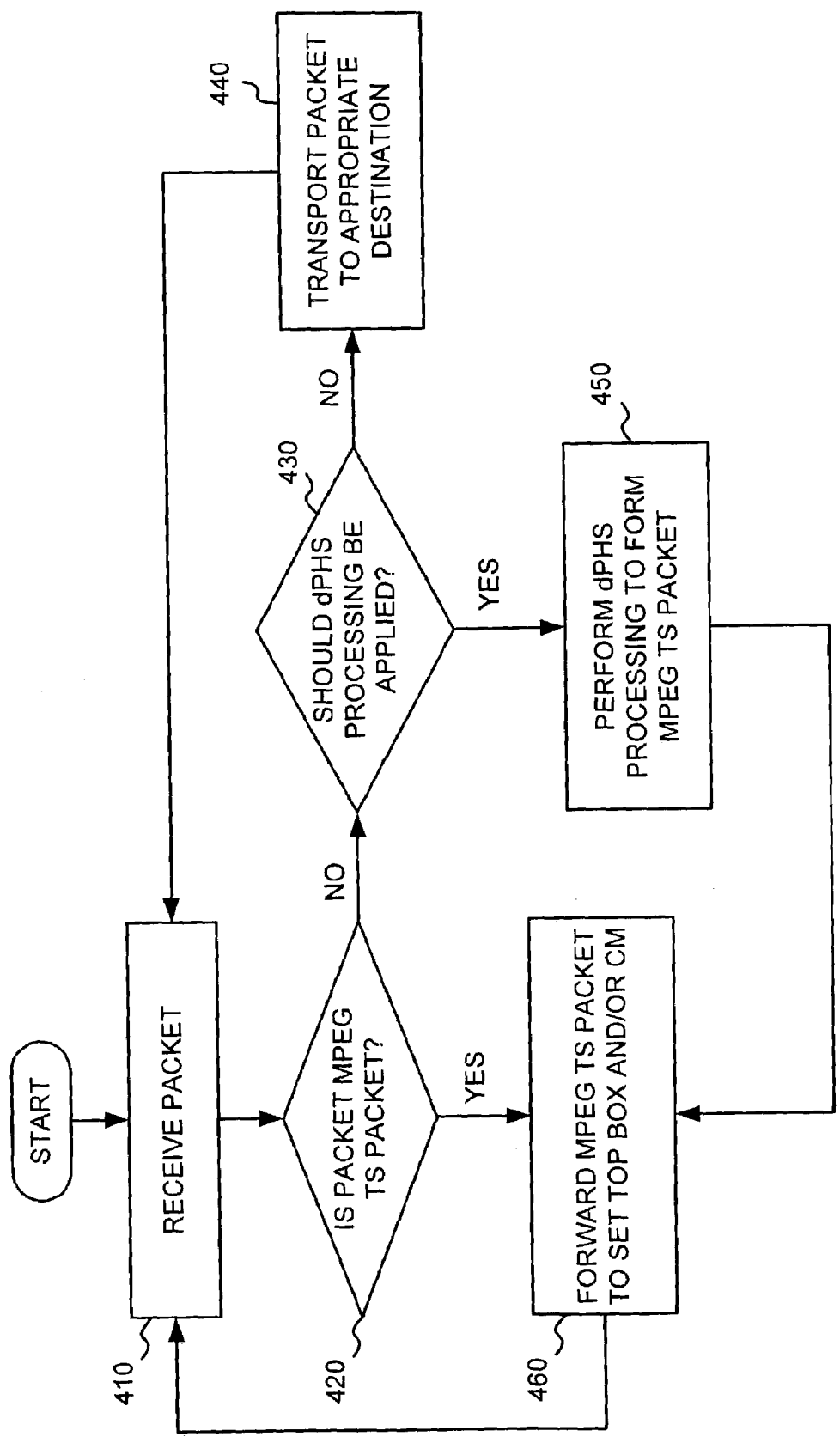
FIG. 4 illustrates an exemplary process for transmitting signals in a network in an implementation consistent with the principles of the present invention.

FIG. 4 illustrates an exemplary process, performed by CMTS 110, for transmitting signals in a network in an implementation consistent with the principles of the invention. Processing may begin with CMTS 110 receiving one or more packets from another device, such as a device associated with IP services 140 or MPEG services 150 (act 410). CMTS 110 may receive the packets via MPEG interface logic 210 or IP interface logic 220. CMTS 110 may then determine whether the packet is an MPEG TS packet (act 420). CMTS 110 may, for example, determine that a packet is an MPEG TS packet when the packet is received at MPEG interface logic 210. Alternatively, CMTS 110 may determine that a packet is an MPEG TS packet by inspecting the fields of the packet.

If CMTS 110 determines that a packet is not an MPEG TS packet (e.g., because it was received at IP interface logic 220), CMTS 110 may classify the packet to determine whether dPHS processing should be applied to the packet (act 430). For example, CMTS 110 may determine that dPHS processing should be applied to the packet when the packet includes MPEG data. In alternative implementations, CMTS 110 may determine that dPHS processing should be applied to all IP packets.

If CMTS 110 determines that dPHS processing should not be applied, CMTS 110 transmits the packet to the appropriate destination (act 440) and processing may return to act 410. If, on the other hand, CMTS 110 determines that dPHS processing should be applied, CMTS 110 may suppress header fields of the received packet to form an MPEG TS packet (act 450).

Figure 5:
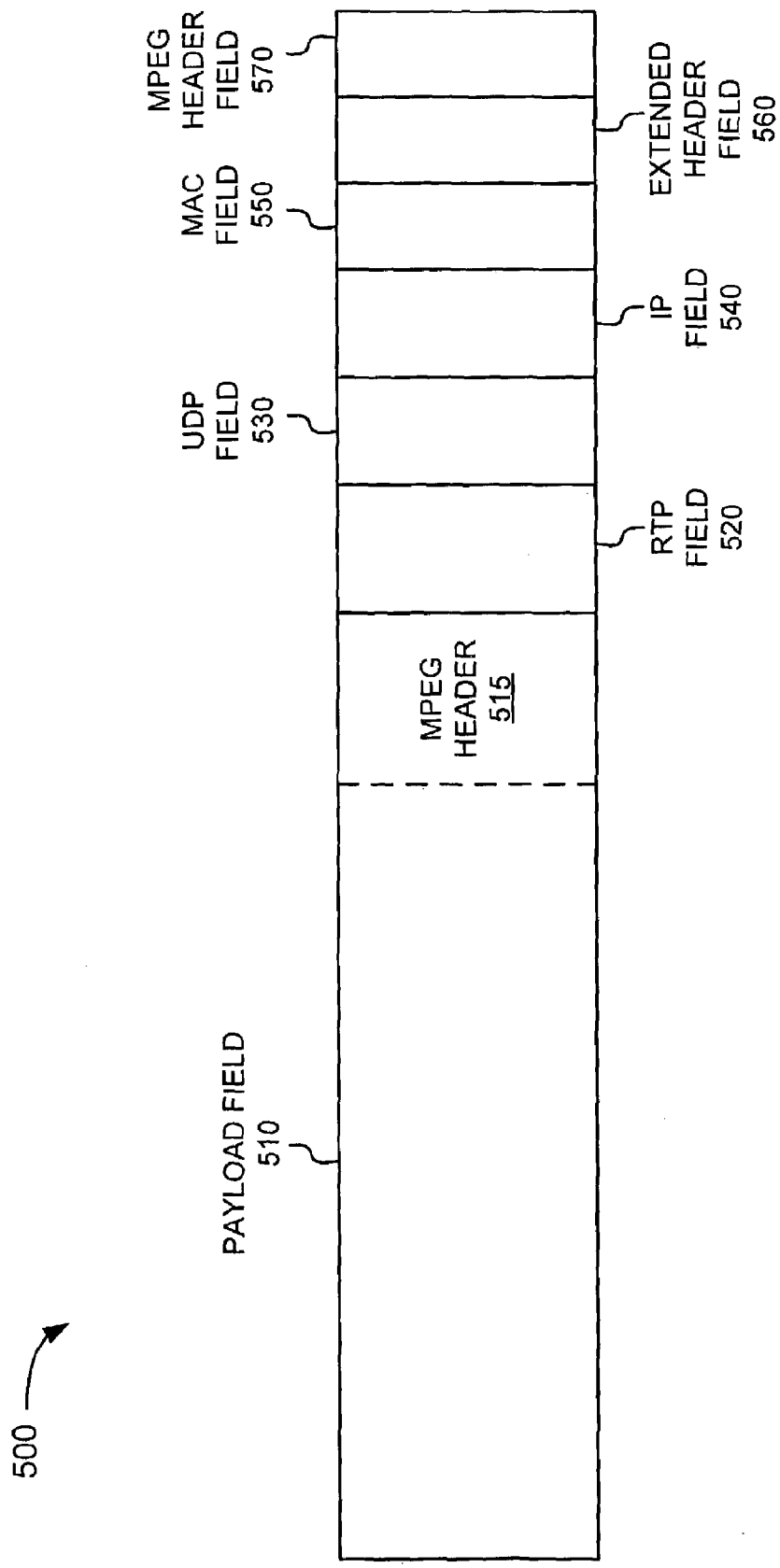
FIG. 5 illustrates an exemplary configuration of a received IP packet in accordance with the principles of the present invention.

FIG. 5 illustrates an exemplary configuration of an IP packet 500 in accordance with the principles of the present invention. As illustrated, IP packet 500 may include a payload field 510, a real-time protocol (RTP) field 520, a user datagram protocol (UDP) field 530, an IP field 540, a media access control (MAC) field 550, an extended header field 560, and an MPEG header field 570. It will be appreciated that a typical IP packet may include additional (or different) fields than illustrated in FIG. 5.

Payload field 510 may include the data transported by packet 500. This data may include, for example, audio and/or video data. Payload field 510 may also include an MPEG header 515 as well-known in the art. MPEG header 515 may include, for example, a synchronization byte, transport error indication information that indicates whether the packet is associated with at least one uncorrectable bit error, payload unit start indication information, transport priority information, information identifying the type of data in the payload (PID), information identifying the scrambling mode of the packet, information indicating whether the packet header is followed by an adaptation field and/or a payload field, and a continuity counter field that increments with each packet of the same PID.

RTP field 520 may include RTP header information that includes, among other things, payload type data and possibly a time stamp. The payload type data may, for example, identify that IP packet 500 includes MPEG data. UDP field 530 may include UDP header information that includes, for example, source and destination port identification information. IP field 540 may include IP header information that includes, for example, source and destination IP addresses. MAC field 550 may include MAC header information that includes, for example, MAC source and destination addresses. Extended header field 560 may include data that aids in data link security, fragmentation, and payload header suppression. In one implementation consistent with the principles of the invention, extended header field 560 may include a payload header suppression sub-field that includes, for example, information identifying whether payload header suppression is being performed in the upstream or downstream, a length value that identifies the length of a payload header suppression index, and the payload header suppression index. MPEG header field 570 may include MPEG header information.

Figure 6:
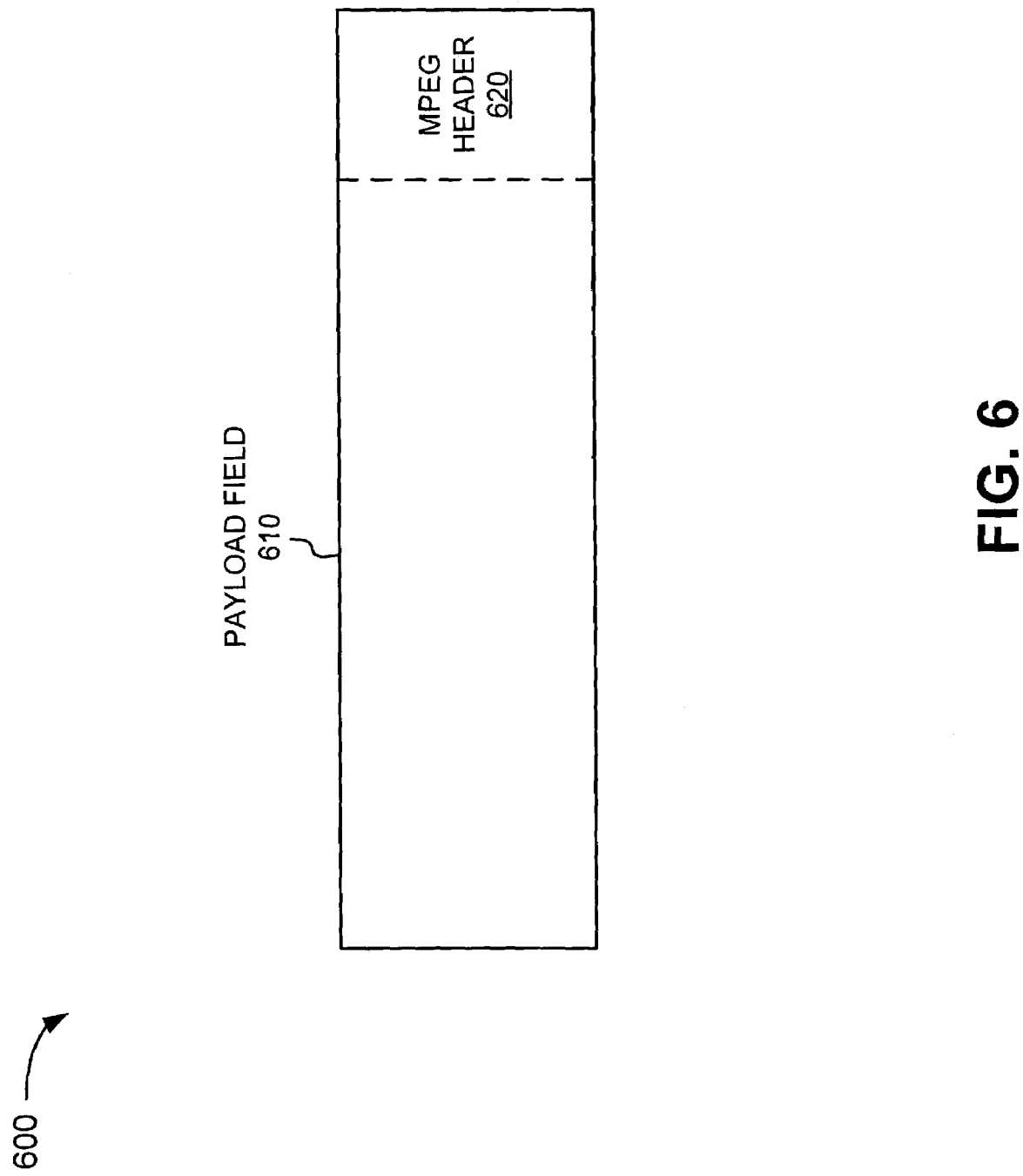
FIG. 6 illustrates an exemplary configuration of an MPEG TS packet in accordance with the principles of the present invention.

FIG. 6 illustrates an exemplary configuration of an MPEG TS packet 600 in accordance with the principles of the present invention. As illustrated, MPEG TS packet 600 may include a payload field 610 that includes an MPEG header 620. It will be appreciated that a typical MPEG TS packet may include additional (or different) fields than illustrated in FIG. 6.

Payload field 610 may include the data transported by packet 600. This data may include, for example, audio and/or video data. MPEG header 620 may include, for example, a synchronization byte, transport error indication information that indicates whether the packet is associated with at least one uncorrectable bit error, payload unit start indication information, transport priority information, a PID, information identifying the scrambling mode of the packet, information indicating whether the packet header is followed by an adaptation field and/or a payload field, and a continuity counter field that increments with each packet of the same PID. In one implementation consistent with the principles of the present invention, MPEG header 620 indicates the headers suppressed by CMTS 110.

To convert a received IP packet, such as packet 500, into an MPEG TS packet, such as packet 600, CMTS 110 may suppress that portion of RTP field 520, UDP field 530, IP field 540, and MAC field 550 that does not change from packet to packet and replace the PID with a value that corresponds to those suppressed fields.

Once the initial payload header suppression processing is performed, CMTS 110 may suppress the remaining portion of RTP field 520, extended header field 560, and MPEG header field 570 into a field in MPEG header 515 to thereby convert the original IP packet 500 into an MPEG TS packet, having, for example, the configuration illustrated in FIG. 6. Similar to the initial payload header suppression processing described above, CMTS 110 may create an index corresponding to the suppressed header information and store this index in a field of MPEG header 515 (or 620 in FIG. 6).

For example, in IP telephony, voice samples may be transported using IP packets, via the RTP protocol. A voice packet that is transported using the RTP/IP protocol may resemble the IP packet configuration illustrated in FIG. 5, with the exception that instead of Payload Field 510 and MPEG Header 515, these fields contain the voice samples. Assuming a 20 millisecond framing interval and G.711 codec, the total length of the DOCSIS downstream channel packet becomes:

| | |
|---|---|
| CRC: | 4 bytes |
| Voice Samples: | 160 bytes |
| RTP Header: | 12 bytes |
| UDP header: | 8 bytes |
| IPv4: | 20 bytes |
| 802.3: | 14 bytes |
| BPI: | 5 bytes |
| DOCSIS MAC: | 6 bytes. |

The above packet may be transported within the 13 bit DOCSIS PID, which adds 5 (i.e., 4 MPEG+1 Payload Unit Start Indicator (PUSI)) additional bytes for every 183 bytes of data. Since the total DOCSIS packet length is 225 bytes, more than one DOCSIS payload should be used.

Using deep PHS the packet can be reduced to:

| | |
|---|---|
| CRC: | 4 bytes |
| Voice: | 160 bytes |
| RTP header: | 12 bytes. |

All this information can be encoded into a downstream unique PID value.

Upon receipt of the IP telephony packet, CMTS 110 strips the UDP/IP/802.3 header and, instead of using the DOCSIS MAC, it encodes the suppressed header into a downstream unique PID value (say 555) and sends the packet as:

| | |
|---|---|
| Padding: | 8 bytes |
| CRC: | 4 bytes |
| Voice: | 160 bytes |
| RTP header: | 12 bytes |
| MPEG Header: | 4 bytes (the PID is set to 555). |

In the DOCSIS Payload Header Suppression method defined in Data-Over-Cable Service Interface Specifications (DOCSIS), Radio Frequency Interface Specification, SP-RFIv1.1-I09-020830, Aug. 30, 2002 the packet would be transported as:

| | |
|---|---|
| CRC: | 4 bytes |
| Voice: | 160 bytes |
| RTP header: | 12 bytes |
| BPI: | 5 bytes |
| DOCSIS MAC: | 6 bytes, | which makes the length of the packet 187 bytes. This amount of data would not fit into one MPEG payload, which is 5 bytes for the DOCSIS. As illustrated in the above example, the use of dPHS is more advantageous than PHS as defined by DOCSIS.

Another example is the transport of MPEG video packets. These packets may be include:

| | |
|---|---|
| CRC: | 4 bytes |
| MPEG Payload: | 184 bytes |
| MPEG Header: | 4 bytes |
| RTP Header: | 12 bytes |
| UDP header: | 8 bytes |
| IPv4: | 20 bytes |
| 802.3: | 14 bytes |
| BPI: | 5 bytes |
| DOCSIS MAC: | 6 bytes. |

The above packet may be transported within the 13 bit DOCSIS PID, which adds 5 (4 MPEG+1 PUSI) additional bytes for every 183 bytes of data. The total length of MPEG payload is, therefore, 257 bytes plus the 5 byte DOCSIS MPEG header making the total length more than 263 bytes.

Using deep PHS the packet can be reduced to:
MPEG Payload: 184 bytes if CMTS 110 sends the MPEG packets timely. Using a unique PID value, this packet becomes 188 bytes, resulting in tremendous savings in bandwidth.

Once the received IP packet has been converted to an MPEG TS packet, CMTS 110 may transmit the packet to CM 120 and/or set top box 130 (act 460). Since the size of payload field 510 is 60 percent of the total size of IP packet 500, the result of the above dPHS processing is a packet that is 40 percent smaller than the originally received IP packet. Accordingly, this dPHS processing provides increased bandwidth efficiency in that part of network 100 between CMTS 110 and CM 120 and/or set top box 130.

Figure 7:
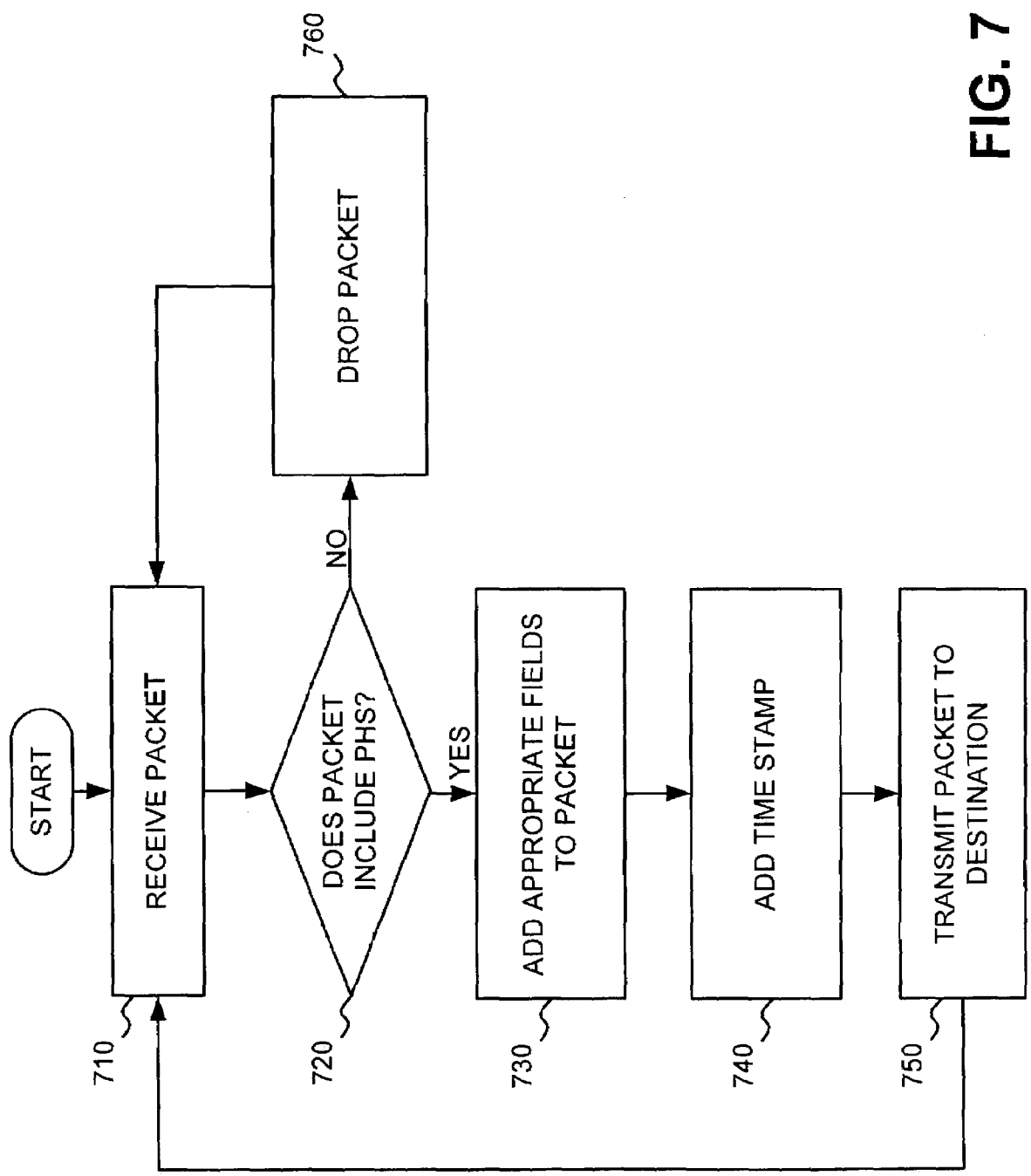
FIG. 7 illustrates an exemplary process for converting an MPEG TS packet into an IP packet in accordance with the principles of the present invention.

FIG. 7 illustrates an exemplary process, performed by CM 120, for converting an MPEG TS packet into an IP packet in accordance with the principles of the invention. Processing may begin with CM 120 receiving an MPEG TS packet, such as MPEG TS packet 600, from CMTS 110 (act 710). Upon receiving the packet, CM 120 may determine whether the packet includes dPHS (act 720). CM 120 may make this determination by, for example, examining the index in MPEG header 620 and determining whether the MPEG header includes a PID that is assigned to a header suppression. If the received packet does not include dPHS, CM 120 may drop the packet (act 760). If, on the other hand, the received packet includes dPHS, CM 120 may add the appropriate header fields back to the packet (act 730). In essence, CM 120 acts to restore the packet to the form in which it was received by CMTS 110. CM 120 may extract the index from MPEG header 620 and use this index, along with other information, such as a stream identifier, to restore the RTP field portion 520, extended header field 560, and MPEG header field 570. CM 120 may restore these headers via, for example, a lookup operation. CM 120 may then restore the remaining portion of RTP field 520, UDP field 530, IP field 540, and MAC field 550 from the index stored in extended header field 560 by using, for example, a lookup operation.

In the IP telephony example given above, CM 120 may perform a lookup operation for the PID value of 555 and may determined, based on the lookup operation, that is associated with specific values for the following fields:

| | |
|---|---|
| RTP Header: | 12 bytes |
| UDP header: | 8 bytes |
| IPv4: | 20 bytes |
| 802.3: | 14 bytes |
| BPI: | 5 bytes |
| DOCSIS MAC: | 6 bytes. |

CM 120 may then process the packet according to DOCSIS rules. In another implementation consistent with the principles of the invention, the suppressed headers may correspond to only the IP layer:

| | |
|---|---|
| RTP Header: | 12 bytes |
| UDP header: | 8 bytes |
| IPv4: | 20 bytes |
| 802.3: | 14 bytes. |

For the MPEG example set forth above, a set-top box, such as set-top box 130 may receive the MPEG data stream and process this data stream as a normal MPEG data stream. Alternatively, a CM, such as CM 120, may receive the same data stream and use the suppressed headers set forth below. In this situation, some of the RTP fields may be filled by CM 120 and CRC may be appended by CM 120 using the real time information that CM 120 has since the packet is received in-time by CMTS 110. The suppressed headers may include:

| | |
|---|---|
| RTP Header: | 12 bytes |
| UDP header: | 8 bytes |
| IPv4: | 20 bytes |
| 802.3: | 14 bytes |
| BPI: | 5 bytes |
| DOCSIS MAC: | 6 bytes. |

CM 120 may then process the packet according to DOCSIS rules. In an alternative implementation, the suppressed headers may correspond to only the IP layer:

| | |
|---|---|
| RTP Header: | 12 bytes |
| UDP header: | 5 bytes |
| IPv4: | 20 bytes |
| 802.3: | 14 bytes. |

Once the header fields have been restored, CM 120 may add timing information to the packet (act 740). The timing information may include, for example, a time stamp that allows a destination device to reorder packets that are received out of order. In one implementation, CM 120 adds the timing information to RTP field 520. CM 120 may then transmit the IP packet to a destination device, such as a customer's computer.

CONCLUSION

Systems and methods consistent with the principles of the present invention provide a dual IP/MPEG TS system in which IP packets can be converted into MPEG TS packets, and vice versa. In an exemplary implementation, a CMTS converts IP packets to smaller MPEG TS packets and transmits the MPEG TS packets to CMs and set top boxes. As a result, a bandwidth savings of approximately 35 bytes per packet can be achieved over conventional payload header suppression techniques.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, although described in the context of a cable routing system, concepts consistent with the principles of the invention can be implemented in any system, device, or chip that communicates with another system, device, or chip via one or more buses. Moreover, although described in a CMTS-to-CM direction, dPHS techniques consistent with the principles of the present invention can also be performed in the CM-to-CMTS direction.

In addition, systems and methods have been described as processing packets. In alternate implementations, systems and methods consistent with the principles of the invention may process other, non-packet, data. In this regard, a data unit may include packet data or non-packet data.

While series of acts have been described with regard to FIGS. 4 and 7, the order of the acts may be varied in other implementations consistent with the present invention. Moreover, non-dependent acts may be implemented in parallel.

Further, certain portions of the invention have been described as "logic" that performs one or more functions. This logic may include hardware, such as an application specific integrated circuit, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A network device comprising:
    logic configured to receive a data unit comprising a plurality of headers, the plurality of headers including:
        a payload field with a first movie professional experts group (MPEG) header,
        a real-time protocol (RTP) header,
        a user data protocol (UDP) header,
        an Internet Protocol (IP) header,
        a media access control (MAC) header,
        an extended header, and
        a second MPEG header;
    logic configured to suppress one or more headers of the plurality of headers to form a reduced data unit, the logic configured to suppress one or more headers of the plurality of data unit headers including:
        logic configured to remove the UDP header, the IP header, the MAC header, and at least a portion of the RTP header,
        logic configured to form a first index based on information associated with the removed UDP header, IP header, MAC header, and a portion of the RTP header, and
        logic configured to store the first index in the extended header;
    logic configured to suppress one or more other headers of the reduced data unit to form a further reduced data unit; and
    logic configured to transmit the further reduced data unit to one or more destination devices.

2. The network device of claim 1 where the logic configured to suppress the one or more headers suppresses the one or more headers to a program identifier (PID) value of a movie professional experts group (MPEG) header that is being used in the data unit.

3. The network device of claim 1 where the received data unit includes an Internet Protocol (IP) packet.

4. The network device of claim 3 where the further reduced data unit includes a movie professional experts group (MPEG) transport stream (TS) packet, which does not use a Data-Over-Cable Service Interface Specifications (DOCSIS) program identifier (PID).

5. The network device of claim 1 where the one or more destination devices include at least one of a cable modem or a set top box.

6. The network device of claim 1 where the logic configured to transmit the further reduced data unit transmits the further reduced data unit using information in the RTP header.

7. A network device comprising:
    logic configured to receive a data unit, the data unit including a movie professional experts group (MPEG) program identifier (PID), a payload field, and a first MPEG header comprising a first index;
    logic configured to determine whether one or more headers of the received data unit have been suppressed using the MPEG PID as an index;
    logic configured to add one or more headers to the received data unit when one or more headers have been suppressed to form a first data unit, the logic configured to add one or more headers to the received data unit including:
        logic configured to add an extended header that includes a second index, and one or more of a second MPEG header, or at least a portion of a real-time protocol (RTP) header to the received data unit based on the first index;
    logic configured to add one or more additional headers to the first data unit to form a second data unit; and
    logic configured to transmit the second data unit.

8. The network device of claim 7 where the data unit is received from a second network device, and
    where the logic configured to add one or more additional headers to the first data unit adds the one or more additional headers using information relating to a time at which the second network device received the data unit.

9. The network device of claim 7 where the received data unit includes a MPEG transport stream (TS) packet.

10. The network device of claim 7 where the second data unit includes an Internet Protocol (IP) packet.

11. The network device of claim 7 where the logic configured to add one or more other headers to the first data unit includes:
logic configured to add one or more of a user data protocol (UDP) header, an Internet Protocol (IP) header, a media access control (MAC) header, or another portion of the RTP header to the first data unit based on the second index.

12. A method comprising:
receiving an Internet Protocol (IP) packet at a first device;
converting the received IP packet to a movie professional experts group (MPEG) transport stream (TS) packet, where the received IP packet includes a payload field including a first MPEG header, a real-time protocol (RTP) header, a user data protocol (UDP) header, an IP header, a media access control (MAC) header, an extended header, and a second MPEG header, and
where the converting includes:
removing the UDP header, the IP header, the MAC header, and at least a portion of the RTP header,
forming a first index based on the removed UDP header, IP header, MAC header, and portion of the RTP header,
storing the first index in the extended header,
removing the extended header, the second MPEG header, and a remaining portion of the RTP header,
forming a second index based on the removed extended header, second MPEG field, and remaining portion of the RTP header, and
storing the second index in the first MPEG header to form the MPEG TS packet; and
transmitting the MPEG TS packet to a second device.

13. The method of claim 12 further comprising:
receiving the MPEG TS packet at the second device;
converting the received MPEG TS packet back into the IP packet; and
transmitting the IP packet.

14. The method of claim 13 where the first device includes a cable modem terminating system (CMTS) and the second device includes a cable modem.

15. The method of claim 12 where the first device includes a cable modem terminating system (CMTS) and the second device includes a set top box.

16. A network device comprising:
means for receiving an Internet Protocol (IP) packet;
means for converting the received IP packet to a movie professional experts group (MPEG) transport stream (TS) packet, where the received IP packet includes a payload field including a first MPEG header, a real-time protocol (RTP) header, a user data protocol (UDP) header, an IP header, a media access control (MAC) header, an extended header, and a second MPEG header, and
where the means for converting includes:
means for removing the UDP header, the IP header, the MAC header, and at least a portion of the RTP header,
means for forming a first index based on the removed UDP header, IP header, MAC header, and portion of the RTP header,
means for storing the first index in the extended header,
means for removing the extended header, the second MPEG header, and a remaining portion of the RTP header,
means for forming a second index based on the removed extended header, second MPEG field, and remaining portion of the RTP header, and
means for storing the second index in the first MPEG header to form the MPEG TS packet; and
means for transmitting the MPEG TS packet.

\* \* \* \* \*